United States Patent
Schinzel et al.

[15] 3,674,781
[45] July 4, 1972

[54] OPTICAL BRIGHTENERS OF THE BENZOXAZOLE SERIES

[72] Inventors: Erich Schinzel, Frankfurt am Main; Ulrich Pintschovius, Kelkheim am Taunus; Karl Heinz Lebkucher, Hofheim am Taunus, all of Germany

[73] Assignee: Farbwerke Hoechst Aktiengesellschaft vormals Meister Lucius & Bruning, Frankfurt/Main, Germany

[22] Filed: Sept. 15, 1970

[21] Appl. No.: 72,492

Related U.S. Application Data

[63] Continuation-in-part of Ser. No. 366,901, May 21, 1964, abandoned, Continuation of Ser. No. 624,721, March 21, 1967, abandoned.

[52] U.S. Cl. .....................260/240 D, 106/176, 117/33.5 T, 252/301.2 W, 252/186, 260/75 T, 260/78 S, 260/88.7 B, 260/479 R
[51] Int. Cl. ...................................C07d 85/48, C09b 23/14
[58] Field of Search ............................................260/240 D

[56] References Cited
UNITED STATES PATENTS 3,262,929   7/1966   Okubo et al. .....................260/240 D Primary Examiner—John D. Randolph
Attorney—Curtis, Morris & Safford

[57] ABSTRACT

Colorless or nearly colorless fluorescent benzoxazole compounds which correspond to the general formula

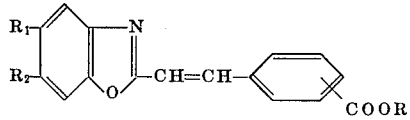

may be used as optical brighteners. In the above formula I, the radical R represents hydrogen, alkyl of one to four carbon atoms, cyclohexyl, halo lower alkyl, hydroxyethyl, lower alkoxy lower alkyl, di-(lower alkyl)-amino lower alkyl, tri-(lower alkyl)-amonium lower alkyl, phenyl and phenyl lower alkyl, and $R_1$ stands for hydrogen, lower alkyl or halogen, $R_2$ stands for lower alkyl.

3 Claims, No Drawings

OPTICAL BRIGHTENERS OF THE BENZOXAZOLE SERIES

The present application is a continuation in part of copending application Ser. No. 366,901, and a continuation of Ser. No. 624,721, filed Mar. 21, 1967, now abandoned.

It is known to use derivatives of benzoxazole as optical brighteners. For example, German Specification 1,040,555 describes a process for preparing α,β-di-[benzoxazolyl-(2)]-ethylenes which are suitable for optically brightening synthetic fibers, for example, fibers made from cellulose esters, especially cellulose acetate, from polyacrylonitrile, polyesters such as polyethylene terephthalate or polyvinyl chloride.

Now, we have found that colorless or nearly colorless fluorescent benzoxazole compounds which correspond to the general formula

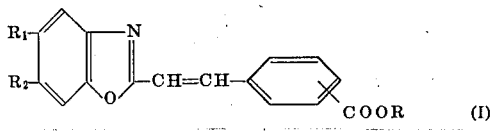

may be used as optical brighteners. In the above formula I, the radical R represents hydrogen, alkyl of one to four carbon atoms, cyclohexyl, halo lower alkyl, hydroxyethyl, lower alkoxy lower alkyl, di-(lower alkyl)-amino lower alkyl, tri-(lower alkyl)-ammonium lower alkyl, phenyl and phenyl lower alkyl, and $R_1$ stands for hydrogen, lower alkyl or halogen, $R_2$ stands for lower alkyl, and $R_1$ and $R_2$ taken together represent $-(CH_2)_3-$ or $-(CH_2)_4-$.

The benzoxazoles of the formula I used in accordance with the present invention as optical brighteners may be prepared by various methods, for example, by the reaction of substituted o-aminophenols with the acid chlorides of 2-, 3- or 4-carbalkoxy-cinnamic acids and subsequent heating of the N-acyl-compounds obtained in an atmosphere of an inert gas in solvents having a high boiling point, if desired or required, in the presence of catalysts such as zinc-chloride, whereby the oxazole ring is closed under separation of water. Further, the interchange of ester radicals of 2-(carbomethoxy-styryl)-benzoxazoles with higher boiling alcohols in the presence of the alcoholates of the respective alcohols is also possible. Furthermore, 2-(cyano-styryl)-benzoxazoles can be converted into 2-(carbo-alkoxy-styryl)-benzoxazoles with the aid of alcohols and hydrogen chloride. Furthermore, the reaction of the acid chlorides of 2-(carboxy-styryl)-benzoxazoles with compounds which contain an alcoholic or phenolic hydroxyl group also leads to compounds of the general formula I.

As o-aminophenols, there may be mentioned, for example, 4-amino-3-hydroxy-toluene, 5-amino-4-hydroxy-1,2-xylene, 5,6,7,8-tetrahydro-3-amino-2-naphthol, 5-amino-6-hydroxy-hydrindene or 6-chloro-4-amino-3-hydroxy-toluene.

As alcoholic or phenolic compounds which may be used for esterfying the 2-(carboxy-styryl)-benzoxazoles, there may be mentioned, for example, mono- or polyhydric, aliphatic, cycloaliphatic, araliphatic alcohols, phenols, and the like, such as methanol, ethanol, n-propanol, isopropanol, n-butanol, tert. butanol, octanol, cyclohexanol, 2-, 3- or 4-methyl-cyclohexanol, 2-chloroethanol-(1), 1-chloropropanol-(2), glycol, propanediol-(1,2), n-butane-diols-(1,3) and (1,4), 2-methyl-n-butanediol-(1,3), n-hexanediol-(2,5), glycerin, penta-erythritol, diethylene glycol, triethylene glycol, glycol monomethyl ether, glycol monoethyl ether, glycol mono-n-butyl ether, 3-methoxy-n-butanol-(1), glycide, phenol, o-, m- or p-cresols, xylenols, benzyl alcohol, 2-phenyl-ethanol-(1), 4-isopropyl-benzyl alcohol, 2-dimethylamino-ethanol-(1), 2-diethylamino-ethanol-(1), 2-di-n-butylamino-ethanol-(1), 1-dimethylamino-propanol-(2).

The novel compounds are distinguished by an excellent fluorescence and very good fastness to light in brightening fibrous materials, above all those made from polyesters of the type of polyethylene glycol terephthalate, polyamide, acetylated cellulose and polyacrylonitrile. The optical brighteners of the present invention can be used in known manner, either in the form of solutions in water or in organic solvents or in the form of dispersions, if desired with the aid of dispersants. The amounts required, which may vary within wide limits, can be easily determined by preliminary tests. The compounds may also be used together with chemical bleaching agents, for example, oxidizing or reducing bleaching agents such as sodium chlorite, sodium boron hydride.

Furthermore, the novel compounds may also be added to the commercial detergents for embellishing the goods to be washed and good brightening effects are obtained on polyester fibers even when washing at temperatures below the boiling point.

The instantly described 5,6-position disubstituted derivatives as represented by structural formula I given above have unexpectedly significantly superior properties as brighteners than the corresponding 5,7-position di-substituted derivatives as described in U.S. Pat. No. 3,262,929.

Further, the novel compounds may also be added to spinning or molding masses which serve for the preparation of synthetic fibers, filaments, foils or other structures.

The following Examples illustrate the versatile possibilities of application of these compounds, but they are not intended to limit them thereto.

EXAMPLE 1

A fabric made from polyethylene glycol terephthalate fibers, bleached in the usual manner with sodium chlorite and still having a slight yellow tint, was treated for half an hour at 95°–98° C with an aqueous bath containing per liter 0.3 % of compound (II)

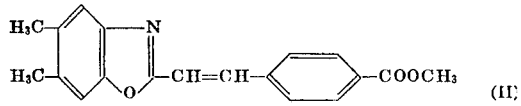

in dispersed form. After the treatment, the fabric showed an excellent white, which was not affected to a remarkable degree upon exposure for 100 hours to the light of a Xenone high pressure lamp. Instead of the compound (II), there can also be used the compounds listed in the following table.

TABLE

| Constitution | Melting point, ° C. |
|---|---|
| Cl—[benzoxazole with H₃C]—CH==CH—⟨phenyl⟩—COOCH₃ | 219–220 |
| H₃C—, H₃C—[benzoxazole]—CH==CH—⟨phenyl⟩—COO—CH₂—CH₃ | 165–167 |
| H₃C—, H₃C—[benzoxazole]—CH==CH—⟨phenyl⟩—COO—CH₂—CH₂—CH₃ | 148.5–150.5 |

| Constitution | Melting point, °C. |
|---|---|
| 5,6-dimethylbenzoxazole-2-CH=CH-C₆H₄-COO-CH₂-CH₂-CH₂-CH₃ | 118.5–121 |
| 5,6-dimethylbenzoxazole-2-CH=CH-C₆H₄-COO-cyclohexyl | 160–162 |
| 5,6-dimethylbenzoxazole-2-CH=CH-C₆H₄-COO-C₆H₅ | 208–210 |
| 5,6-dimethylbenzoxazole-2-CH=CH-C₆H₄-COO-CH₂-CH₂-O-CH₂-CH₃ | 116–117.5 |
| 5,6-dimethylbenzoxazole-2-CH=CH-C₆H₄-COO-CH₂-C₆H₅ | 179–181 |
| (cyclopenta-fused)benzoxazole-2-CH=CH-C₆H₄-COOCH₃ | 191–192 |
| 5,6-dimethylbenzoxazole-2-CH=CH-C₆H₄-COO-C(CH₃)₃ | 136–138 |
| 5,6-dimethylbenzoxazole-2-CH=CH-C₆H₄-COO-CH₂-CH₂-Cl | 175.5–178 |
| 5,6-dimethylbenzoxazole-2-CH=CH-C₆H₄-COO-CH₂-CH₂-OH | 176–176.5 |
| 5,6-dimethylbenzoxazole-2-CH=CH-C₆H₄(o-COOCH₃) | 163.5–165.5 |
| 6-methylbenzoxazole-2-CH=CH-C₆H₄-COOCH₃ | 152.5–154 |
| (cyclohexa-fused)benzoxazole-2-CH=CH-C₆H₄-COOCH₃ | 189–191 |
| [(cyclohexa-fused)benzoxazole-2-CH=CH-C₆H₄-COO-CH₂CH₂-N⁺(CH₃)₃] OSO₃CH₃⁻ | F. 92 (1) |
| 5,6-dimethylbenzoxazole-2-CH=CH-C₆H₄(m-COOCH₃) | 161–163 |

The above listed compounds are also stable in a chlorite bleaching bath and give good brightening effects.

The 2-(4'-carbomethoxy-styryl)-5,6-dimethyl-benzoxazole (II) mentioned above can be prepared as follows:

A 50° C warm solution of 22.5 parts by weight of 4-carbomethoxy-cinnamic acid-chloride in 100 parts by volume of chlorobenzene is slowly added, while stirring, to a 60° C warm mixture of 13.7 parts by weight of 5-amino-4-hydroxy-1,2-dimethyl benzene, 18 parts by weight of N,N-dimethyl-aniline and 100 parts by volume of chlorobenzene and the whole is further stirred for 2 hours at 60° to 65° C. After cooling, the reaction product which precipitates at 5° C is filtered off with suction and treated with steam until all adhering chlorobenzene and dimethylaniline is volatilized. After suction-filtration and drying, there are obtained 28 parts by weight of the 4-carbomethoxy-cinnamic acid amide of 5-amino-4-hydroxy-1,2-dimethyl-benzene having a melting point of 231 – 232° C (with decomposition).

In order to convert the compound into the benzoxazole derivative, the dried carboxylic acid amide (28 parts by weight) is heated in a flask provided with a gas inlet and a descending reflux condenser, while passing through nitrogen, together with 50 parts by volume of distilled trichloro-benzene and in the presence of 0.2 part by weight of molten zinc chloride, for 1 hour to 210° C on an oil bath. The molten mass, which crystallizes upon cooling, is combined at 60° C with 50 parts by volume of ethanol, the mixture is cooled to 5° C and filtered off with suction. There are obtained 25 parts by weight of 2-(4'-carbomethoxy-styryl)-5,6-dimethyl-benzoxazole which is purified by recrystallization from dioxane with the addition of animal charcoal. Melting point: 200° – 201° C.

Compound (II) can also be prepared by the following method:

Hydrogen chloride gas is introduced during 5 hours into a suspension of 10.0 parts by weight of 2-(4'-cyano-styryl)-5,6-dimethyl-benzoxazole (melting point 198° – 200° C) in 100 parts by volume of methanol. Upon cooling of the reaction mixture, 8 parts by weight of 2-(4'-carbomethoxy-styryl)-5,6-dimethyl-benzoxazole separate, which, after redissolution, has a melting point of 199° – 200° C and which is identical with the 2-(4'-carbomethoxy-styryl)-5,6-dimethyl-benzoxazole prepared in the manner described above.

The preparation of the compounds listed in the table likewise does not represent difficulties. For example, the mentioned 2-(4'-carbobutoxy-styryl)-5,6-dimethyl-benzoxazole can be prepared as follows:

20 parts by weight of the above-mentioned 2-[4'-carbomethoxy-styryl]-5,6-dimethyl-benzoxazole are boiled under reflux for 6 hours in 500 parts by volume of n-butanol in the presence of 10 parts of sodium butylate. Upon cooling, 13 parts by weight of 2-[4'-carbo-n-butoxy-styryl]-5,6-dimethyl-benzoxazole crystallize out. After recrystallization from cyclohexane or ethyl acetate, there are obtained needles having a melting point of 118.5° – 121° C.

EXAMPLE 2

An unbleached fabric made from polyethylene glycol terephthalate filaments was bleached at a goods-to-liquor ratio of 1:20 for half an hour at 80° – 85° C and further bleached for half an hour at 98° C.

The bleaching bath, which had a pH-value of 3.5, contained per liter 0.15 g of the following compound (III)

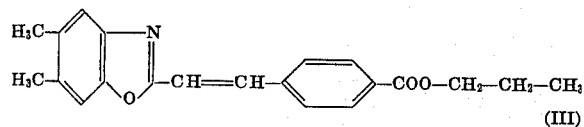

(III)

in dispersed form and 0.5 g/l of sodium chlorite (100 % strength). The white of the fabric thus treated was bright and clear.

EXAMPLE 3

A fabric made from polyethylene glycol terephthalate filaments bleached in the usual manner was impregnated with an aqueous dispersion containing per liter 5 g of compound II and squeezed on the foulard to the extent that the fabric retained 60 percent of its weight of dispersion. The fabric was then treated for 60 seconds at 190° C with hot air. After this treatment it showed a beautiful uniform white.

EXAMPLE 4

0.5 percent of the compound (IV)

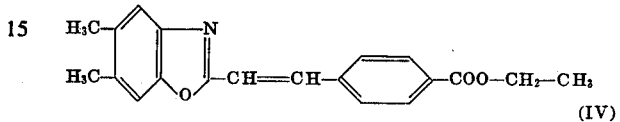

(IV)

was added to a detergent having the following composition:
12 % of alkylaryl sulfonate
6 % of oleylaminooctaglycol ether
4 % of potassium pyrophosphate
8 % of sodium salt of p-toluenesulfonic acid.

A greyed polyester fabric was washed for 10 minutes at 80° C with a bath containing per liter 3 g of the above detergent. After this treatment, the fabric showed a beautiful agreeable white. Even after 10 washers of the above manner, no undesired discoloration could be observed.

The 2-(4'-carbethoxy-styryl)-5,6-dimethyl-benzoxazole (IV) can be prepared as follows:

A solution of 2.3 parts by weight of sodium metal in 50 parts by volume of ethanol is added at room temperature and while stirring to a suspension of 31.2 parts by weight of the acid chloride of 2-(4'-carboxy-styryl)-5,6-dimethyl-benzoxazole (light yellow crystals from toluene, melting point: 223° – 224° C) in 150 parts by volume of anhydrous dioxane. The whole is heated for 4 hours to 50° C and the ethyl ester that has formed is precipitated by means of water.

There are obtained 29.2 parts by weight of compound IV. After 4 recrystallizations from ethyl acetate using animal charcoal, the melting point is at 165° – 167° C.

EXAMPLE 5

An unbleached fabric made from a copolymer consisting of at least 85 percent of polyacrylonitrile was bleached for 30 minutes at 80° – 85° C, at a pH-value of 3.5, with a bath containing
1.2 % of sodium chlorite (100 % strength)
1.0 % of bleaching auxiliary (consisting of 32 % of oleic acid methyl tauride, 60 % of ammonium sulfate and 8 % of sodium pyrophosphate),
0.2 ml/l of acetic acid (100 % strength), and
1.2 ml/l of sulfuric acid (1:10), and then further treated for half an hour at 98° C. The bleaching bath contained 0.2 percent (addition in the form of an aqueous dispersion) of compound (V)

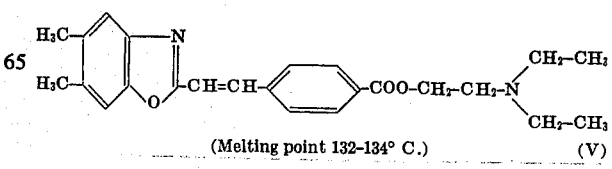

(Melting point 132–134° C.)   (V)

The fabric thus treated showed an excellent white which did not change even after a 120 hours exposure to the light of a Xenone high pressure lamp.

Instead of compound (V), there can also be used the following compound (VI):

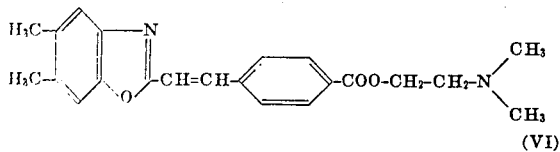

(VI)

The afore-mentioned compound (VI) can be prepared as follows:

13 parts by volume of 2-dimethylamino-ethanol are added, while stirring, to a 70° C hot solution of the acid chloride of 32.5 parts by weight of 2-(4'-carboxy-styrol)-5,6-dimethyl-benzoxazole in 330 parts by volume of chlorobenzene. After 2 hours heating on the water bath, the product is filtered off with suction, treated at 50° C with a solution of 15 parts by weight of potassium hydrogen carbonate in 200 parts by volume of water and washed with water. After drying, there are obtained 27 parts by weight of β-dimethylamino-ethyl ester of the general formula (VI). After recrystallization, the compound melts at 138°–139° C.

EXAMPLE 6

A fabric made from a copolymer containing at least 85 % of polyacrylonitrile, bleached in the usual manner, was treated at a goods-to-liquor ratio of 1:20 with 0.06 g/l of an aqueous solution of compound (VII)

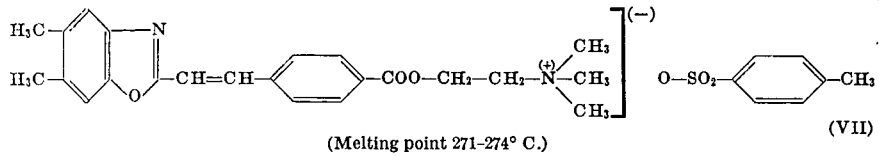

(Melting point 271-274° C.)

for half an hour at 98° C. After the treatment, the fabric showed a brillant white which could not be obtained without using an optical brightener.

In similar manner, there may also be used the following benzoxazole of the general formula (VIII) instead of compound (VII):

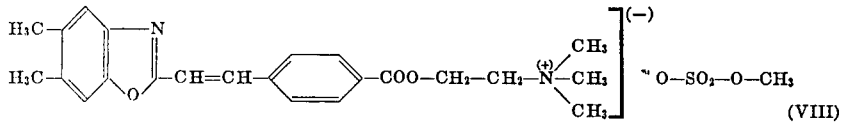

(VIII)

The quaternary ammonium salt of the general formula (VIII) can be prepared as follows:

A mixture of 8 parts by weight of compound (VI), 40 parts by volume of methanol and 2.8 parts by volume of dimethyl sulfate is boiled for 1 hour under reflux. After suction-filtration in the cold, 10 parts by weight of the quaternary ammonium salt having a melting point of 243° – 245245° C are obtained.

EXAMPLE 7

A fabric consisting of 50 percent of vinylidene cyanide and 50 percent of vinyl acetate, bleached in the usual manner, was treated for 30 minutes at 98° C, at a goods-to-liquor ratio of 1:20, with a bath consisting of 10 g/l of phthalic acid dimethyl ester
2 g/l of the sulfate of alkylaryl-polyglycol ether, and
0.1g/l of compound (VIII).

The determination of the white, carried out on a Zeiss-El-repho at a wave length of 460 μ, gave a value of 91.0 percent referred to magnesium oxide as standard with 100 percent. (The non brightened fabric showed a value of 83 percent).

What is claimed is:

1. A compound of the formula

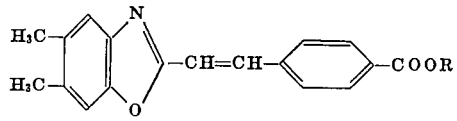

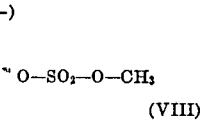

(VII)

in which R is a, β-ethoxyethyl or β-(trimethyl ammonium)-ethyl methosulfate group.

2. A compound according to claim 1 wherein R is — $CH_2CH_2$—$OCH_2CH_3$.

3. A compound according to claim 1 wherein R is $CH_2CH_2$—$\overset{(+)}{N}(CH_3)_3] \overset{(-)}{O}$—$SO_2$—$OCH_3$

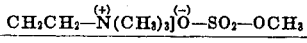

UNITED STATES PATENT OFFICE
CERTIFICATE OF CORRECTION

Patent No. 3,674,781     Dated July 4, 1972

Inventor(s) Schinzel et al.

It is certified that error appears in the above-identified patent and that said Letters Patent are hereby corrected as shown below:

In the Heading:

Under "Related U.S. Application Data" and after "Ser. No. 366,901," correct "May 21, 1964" to read --May 12, 1964--;

After "March 21, 1967, abandoned." and before "[52] U.S. Cl." insert

--Foreign Application Priority Data

May 17, 1963     Germany... F 39 765--.

Signed and sealed this 5th day of December 1972.

(SEAL)
Attest:

EDWARD M. FLETCHER, JR.     ROBERT GOTTSCHALK
Attesting Officer            Commissioner of Patents